(12) United States Patent
Quast et al.

(10) Patent No.: US 8,345,749 B2
(45) Date of Patent: Jan. 1, 2013

(54) METHOD AND SYSTEM FOR TRANSCODING REGIONS OF INTERESTS IN VIDEO SURVEILLANCE

(75) Inventors: Katharina Quast, Erlangen (DE); Andre Kaup, Effeltrich (DE); Hermann Hampel, Grosshabersdorf (DE)

(73) Assignee: iAd Gesellschaft für Informatik, Automatisierung und Datenverarbeitung mbH, Grosshabersdorf (DE)

( * ) Notice: Subject to any disclaimer, the term of this patent is extended or adjusted under 35 U.S.C. 154(b) by 643 days.

(21) Appl. No.: 12/550,760

(22) Filed: Aug. 31, 2009

(65) Prior Publication Data
US 2011/0051808 A1    Mar. 3, 2011

(51) Int. Cl.
| H04B 1/66 | (2006.01) |
| H04N 7/12 | (2006.01) |
| H04N 11/02 | (2006.01) |
| H04N 11/04 | (2006.01) |

(52) U.S. Cl. .................................. 375/240.08
(58) Field of Classification Search ........................ None
See application file for complete search history.

(56) References Cited

U.S. PATENT DOCUMENTS

| 5,742,343 | A * | 4/1998 | Haskell et al. | 375/240.15 |
| 6,400,768 | B1 * | 6/2002 | Nagumo et al. | 375/240.18 |
| 6,700,933 | B1 * | 3/2004 | Wu et al. | 375/240.16 |
| 7,024,046 | B2 * | 4/2006 | Dekel et al. | 382/240 |
| 7,116,833 | B2 * | 10/2006 | Brower et al. | 382/240 |
| 2002/0150158 | A1 * | 10/2002 | Wu et al. | 375/240.12 |
| 2004/0006582 | A1 * | 1/2004 | Hagihara | 708/400 |
| 2004/0017949 | A1 * | 1/2004 | Lin et al. | 382/232 |
| 2004/0032989 | A1 * | 2/2004 | Sakaguchi | 382/240 |
| 2004/0120591 | A1 * | 6/2004 | Brower et al. | 382/240 |
| 2004/0228535 | A1 * | 11/2004 | Honda et al. | 382/233 |
| 2005/0111057 | A1 * | 5/2005 | Hayakawa | 358/474 |
| 2005/0147164 | A1 * | 7/2005 | Wu et al. | 375/240.12 |
| 2005/0175251 | A1 * | 8/2005 | Taketa et al. | 382/248 |
| 2005/0220192 | A1 * | 10/2005 | Huang et al. | 375/240.16 |
| 2005/0275721 | A1 * | 12/2005 | Ishii | 348/159 |
| 2006/0120610 | A1 * | 6/2006 | Kong et al. | 382/232 |
| 2006/0176951 | A1 * | 8/2006 | Berman et al. | 375/240.01 |
| 2006/0230162 | A1 * | 10/2006 | Chen et al. | 709/229 |

(Continued)

OTHER PUBLICATIONS

Garcia-Alvarez et al., "Region of Interest Extraction Method using Wavelets", 2009, IEEE, 2009 Second International Conference on Communication Theory, Reliability, and Quality of Service, pp. 119-124.*

(Continued)

*Primary Examiner* — Phirin Sam
*Assistant Examiner* — Peter Chau
(74) *Attorney, Agent, or Firm* — Rankin, Hill & Clark LLP

(57) ABSTRACT

A method and a system for spatial scalable region of interest transcoding of JPEG2000 coded video frames for video surveillance systems. Based on a user defined ROI, the method transcodes HD frames into images in moderate resolution with a ROI in HD resolution. The transcoder extracts all packets belonging to the ROI or the lower resolution levels of the background from the JPEG2000 bitstream. Non-ROI packets of higher resolution levels are replaced by empty packets. The ROI is tracked using a mean shift algorithm to guarantee that always the correct image details are extracted in high resolution. Since the transcoding is performed by extracting and replacing packets of the codestream, an expensive re-encoding of the code-stream is not required. Thus, the transcoding technique is of low complexity and shows a short processing time. Combining the transcoding technique with mean shift tracking leads to a powerful video transcoding technique.

12 Claims, 10 Drawing Sheets

U.S. PATENT DOCUMENTS

| | | | | |
|---|---|---|---|---|
| 2006/0239574 | A1* | 10/2006 | Brower et al. | 382/240 |
| 2006/0269103 | A1* | 11/2006 | Brown et al. | 382/103 |
| 2007/0040909 | A1* | 2/2007 | Chang | 348/143 |
| 2007/0070201 | A1* | 3/2007 | Yokomitsu et al. | 348/169 |
| 2007/0206873 | A1* | 9/2007 | Schwenke et al. | 382/239 |
| 2007/0230564 | A1* | 10/2007 | Chen et al. | 375/240.01 |
| 2007/0237409 | A1* | 10/2007 | Atsumi et al. | 382/239 |
| 2007/0296817 | A1* | 12/2007 | Ebrahimi et al. | 348/161 |
| 2008/0205703 | A1* | 8/2008 | Brown et al. | 382/103 |
| 2009/0022412 | A1* | 1/2009 | Okada | 382/240 |
| 2009/0067626 | A1* | 3/2009 | Dufaux et al. | 380/217 |
| 2009/0296810 | A1* | 12/2009 | Kong et al. | 375/240.12 |
| 2009/0296989 | A1* | 12/2009 | Ramesh et al. | 382/103 |
| 2009/0300692 | A1* | 12/2009 | Mavlankar et al. | 725/94 |
| 2010/0119157 | A1* | 5/2010 | Kameyama | 382/195 |
| 2011/0206286 | A1* | 8/2011 | Taketa et al. | 382/232 |
| 2012/0002728 | A1* | 1/2012 | Eleftheriadis et al. | 375/240.16 |

OTHER PUBLICATIONS

Garcia et al., "Region-of-Interest Tracking Based on Keypoint Trajectories on a Group of Pictures", 2007, IEEE, pp. 198-203.*

Girod et al., "Region-of-Interest Prediction for Interactively Streaming Regions of High Resolution Video", 2007, IEEE.*

Hata et al., "Surveillance System with Object-Aware Video Transcoder", 2005, IEEE.*

Kong et al., "Fast Region-of-Interest Transcoding for JPEG 2000 Images", 2005, IEEE, pp. 952-955.*

Meessen et al., "Remote Interactive Browsing of Video Surveillance Content Based on JPEG 2000", 2009, IEEE.*

Quast et al., "Spatial Scalable JPEG2000 Transcoding and Tracking of Regions of Interest for Video Surveillance", 2008, VMV.*

Kaup et al., "Spatial Scalable Region of Interest Transcoding of JPEG2000 for Video Surveillance", 2008, IEEE Fifth International Conference on Advanced Video and Signal Based Surveillance.*

Hampapur et al., "Smart Video Surveillance", Mar. 2005, IEEE Signal Processing Magazine, vol. 22 Issue 2, pp. 38-51.*

C. Christopoulos, A. Skodras, and T. Ebrahimi; "The JPEG2000 still image coding system: an overview" in IEEE Transactions on Consumer Electronics, 46(4):1103-1127, Nov. 2000.

M. Rabbani and R. Joshi; "An overview of the JPEG 2000 still image compresssion standard" in Signal Processing: Image Communication, 17(1):3-48, Jan. 2002.

R. Rosenbaum and H. Schumann; "Flexible, dynamic and compliant region of interest coding in JPEG2000" in IEEE International Conference on Image Processing (ICIP), pp. 101-104, Rochester, New York, Sep. 2002.

J. Hou, X. Fang, J. Li, H.Yin, and S. Yu; "Multi-rate, dynamic and compliant region of interest coding for JPEG2000" in IEEE International Conference on Multimedia and Expo (ICME), pp. 733-736, 2006.

JPEG2000 standard ISO/IEC 15444-1; "Information technology—JPEG 2000 image coding system—part 1", Mar. 2000.

L. Liu and G. Fan; "A new JPEG2000 region-of-interest image coding method: Partial significant bitplanes shift" IEEE Signal Processing Letters, 10(2):35-38, Feb. 2003.

V. Sanchez, A. Basu, and M. K. Mandal "Prioritized region of interest coding in JPEG2000" IEEE Transactions on Circuits and Systems for Video Technology, 14(9):1149-1155, Sep. 2004.

D. Comaniciu and V. Ramesh and P. Meer; "Real-Time Tracking of Non-Rigid Objects using mean shift" in Proc. IEEE Conf. Computer Vision and Pattern recognition, 2: 142-149, 2000.

D. Comaniciu and V. Ramesh and P. Meer; "Mean Shift: A Robust Approach Toward Feature Space Analysis" in IEEE Transactions on Pattern Analysis and Machine Intelligence, 24(5):603-619, 2002.

* cited by examiner

METHOD AND SYSTEM FOR TRANSCODING REGIONS OF INTERESTS IN VIDEO SURVEILLANCE

BACKGROUND OF THE INVENTION

1. Field of the Invention

Applications in video surveillance as well as many other applications of video technology require video images in high resolution. But regular video surveillance systems provide images at TV resolutions like 640×480 or 704×576 pixel or at even lower resolutions. Such resolutions can provide a sufficient overview of the scene but a lot of image details are lost. Enlarging the interesting image regions (so called Regions of Interest, ROIs) still can't provide the detailed information, because of the lacking high frequency image information.

Using cameras providing a higher resolution like 1920× 1080 or 1280×960 pixel preserves enough image details but also causes an enormous increase in the amount of image data. Applying compression methods (e.g. H.264 or JPEG2000) can reduce the amount of image data, but for archiving the video sequences over longer periods of time the amount of image data might still be too large.

But as higher spatial resolution is required at certain image regions only, it is not necessary and even adversarial to provide the whole image at higher resolution. Often, it is sufficient to only have certain regions of interest in an image in high resolution while saving vast amounts of data through encoding the rest of the image in lower resolution. Since the user has to be able to select a region of interest and to request high frequency information for the ROI, the image as to be provided at a moderate resolution at first.

2. Description of the Related Art

Only simulcast based techniques can be used to initially provide a hierarchical coded image in lower image resolution for the user, in order that the user can request a certain image region in higher resolution. But simulcast methods generate two separate codestreams, one for the image in moderate resolution and one for the ROI. Since these two codestreams are handled independently from each other, coding, transmitting and decoding of the codestreams is also performed separately. Thus, redundancies between the image in moderate resolution and the ROI in high resolution can not be considered.

There exist methods for coding ROIs using JPEG2000. These methods do consider redundancies between the image in moderate resolution and the ROI in high resolution, but either the region of interest has to be defined before the coding is done see for example C. Christopoulos, A. Skodras, and T. Ebrahimi "The JPEG2000 still image coding system: an overview" in IEEE Transactions on Consumer Electronics, 46(4): 1103-1127, November 2000 or M. Rabbani and R. Joshi "An overview of the JPEG 2000 still image compression standard" in Signal Processing: image Communication, 17(1):3-48, January 2002 or R. Rosenbaum and H. Schumann "Flexible, dynamic and compliant region of interest coding in JPEG2000" in IEEE International Conference on Image Processing (ICIP), pages 101-104, Rochester, N.Y., September 2002 or a decoding, which re-arranges the coded data into new packets and re-encodes the packet headers and therewith increases the transcoding technique as well as the computational complexity, is necessary, see R. Rosenbaum and H. Schumann (see above) or J. Hou, X. Fang, J. Li, H. Yin, and S. Yu "Multi-rate, dynamic and compliant region of interest coding for JPEG2000" in IEEE International Conference on Multimedia and Expo (ICME), pages 733-736, 2006.

In the Joint Photographic Experts Group (JPEG) standard recommended by the International Standard Organization (ISO) and International Telecommunication Union (ITU) as the international standard coding method for still pictures, Differential Pulse Code Modulation (DPCM) is used for reversible compression and Discrete Cosine Transform (DCT) is used for non-reversible compression. It is also sometimes the case that X-ray images are encoded before storage so as to reduce the volume of data involved, but it is preferable that such encoded images be displayed promptly, without delay. The ability to display such encoded images promptly makes it possible also to priority display an area useful to the diagnosis from the encoded image data. To solve this problem U.S. Pat. No. 7,031,506 B2 Tsujii et al provides an image processing apparatus comprising:

first acquisition means for acquiring a first portion of a data stream obtained from image data that has been sequenced, converted and encoded;

decoding means for decoding the data stream acquired by the first acquisition means and obtaining a two-dimensional image;

analysis means for analyzing the two-dimensional image obtained by the decoding means and determining an area of interest within the two-dimensional image; and second acquisition means for acquiring a second portion selected from the data stream based on the area of interest determined by the analysis means.

Additionally U.S. Pat. No. 7,031,506 B2 Tsujii et al provides an image processing method, comprising:

a first acquisition step for acquiring a first portion of a data stream obtained from image data that has been sequenced, converted and encoded;

a decoding step for decoding the data stream acquired in the first acquisition step and obtaining a two-dimensional image;

an analysis step for analyzing the two-dimensional image obtained in the decoding step and determining an area of interest within the two-dimensional image; and a second acquisition step for acquiring a second portion selected from the data stream based on the area of interest determined in the analysis step.

U.S. Pat. No. 7,031,506 B2 Tsujii et al displays preferably regions of interests ROI and uses the scalable of JPEG2000 on a codeblock-basis for a diagnosis from encoded image data und thus makes it possible to priority read an area of interest (AOI) important to the diagnosis or observation as determined by a diagnostic support means and to improve the quality of that image of that area, so as to effectively improve the accuracy of diagnostic support. Nevertheless U.S. Pat. No. 7,031,506 B2 Tsujii et al doesn't show a ROI-transcoding method or means for ROI-transcoding.

Furthermore US 2005/0237380 A1 Kakii et al shows coding and decoding methods for motion-image data transmitted and received between the terminal equipments of a video conference in two-way interactive systems. In the JPEG2000 Part-I ROI coding, there is the difference between compression levels for the region of interest and for the region of no interest, but the total code length is invariant. The ROI coding is implemented by adjustment of wavelet coefficients, but the wavelet coefficients are calculated using a plurality of spatial pixels, which caused the problem that a boundary was blurred between the ROI and the region of no interest in a decoded still image and it did not allow an image processing operation such as a work of embedding only the ROI in another image. To solve this problem US 2005/0237380 A1 Kakii et al shows a coding method for motion-image data comprising a step, prior to image compression, of dividing an image frame to be coded among image frames constituting motion-image data, into a plurality of sub-regions, and a step of grouping each of the sub-regions into either of a region of interest set in the image frame and a region of no interest different from the region of interest. Then the coding method for the motion-image data compresses each of the sub-regions so that a code length of a sub-region grouped into the region of interest (hereinafter referred to as ROI) out of the plurality of sub-regions is larger than a code length of a sub-region grouped into the region of no interest (hereinafter referred to as non-ROI), thereby generating coded data of each image frame. The shape of the sub-regions of each image frame does not have to be limited to rectangular shapes such as a square and rectangles, but may be one of various polygonal shapes such as triangles, rhomboids, trapezoids, and parallelograms. Furthermore, these sub-regions may be comprised of those of mutually different shapes such as a combination of plural types of polygons, or shapes including curves forming a part of a circular, elliptical, or other shape. The ROI may be preliminarily set by a user himself or herself, or the setting of the ROI may be altered on the way of communication. Furthermore, it can also be contemplated that a sub-region in which a motion of an image is detected, out of the plurality of sub-regions is automatically grouped into the ROI. In the coding process for the rectangular regions in the non-ROI out of the plurality of rectangular regions, the code length of the rectangular regions may be 0 during a certain period of time (which means that the non-ROI is not coded), in consideration of the degree of influence of each region in the image frame on the dialogue. When the tiling technology of JP2 is applied to each of the plural types of images allocated to the plurality of sub-regions forming the virtual image frame as described above, these plural types of images corresponding to tiles can be individually coded at mutually different compression levels. Nevertheless US 2005/0237380 A1 Kakii et al doesn't show a ROI-transcoding method or means for ROI-transcoding but only non-ROI-regions where coded with shorter codewords than ROI-regions.

Furthermore US 2007/0217698 A1 Son relates to an image compressing apparatus, an image compressing method and a program therefore, for compressing and coding image data according to JPEG2000 or such. To provide an image compressing apparatus, by which, instead of carrying out a complicated calculation and a complicated circuit configuration, said image compressing apparatus is configured to carry out code amount control upon JPEG2000 coding, in which the number of coding passes and a code amount for each code block generated by a MQ (arithmetic) coder are input, and a number of coding passes and a code amount are determined based on a first code amount control standard and a second code amount control standard given for each code block. In this configuration, for a specific code block, the second code amount control standard is used to determine the number of coding passes and the code amount, while, for the other code blocks, the first code amount control standard is used to determine the number of coding passes and the code amount. The code blocks to use the second code amount control standard are determined by a frame to process. The image compressing method of US 2007/0217698 A1 Son for carrying out code amount control upon JPEG2000 coding, in which a number of coding passes and a code amount for each code block generated by a MQ (arithmetic) coder are input, and a number of coding passes and a code amount are determined based on a first code amount control standard and a second code amount control standard given for each code block, comprising the steps of:

a) using, for a specific code block, the second code amount control standard to determine the number of coding passes and the code amount; and b) using, for the other code blocks, the first code amount control standard to determine the number of coding passes and the code amount.

Nevertheless US 2007/0217698 A1 Son shows JPEG2000 coding with ROI based on code blocks but doesn't show a ROI-transcoding method or means for ROI-transcoding.

Finally US 2007/0230658 A1 Okada et al provides an image coding method and an image coding apparatus capable of realizing various processing that utilize a region of interest when it is specified in a part of an image and to provide an image decoding method and an image decoding apparatus therefore. The image coding method according to US 2007/0230658 A1 Okada et al is such that information for specifying a region of interest defined on an image is explicitly described in a codestream containing coded data of the image. The "information for specifying a region of interest" may be information which is coded by referring to difference information between frames. This "different information" may be represented by a variation between frames in at least one of position, size and shape of the region of interest. It may be a difference between an average value of at least one of values representing the position, size and shape of the region of interest in each frame and values corresponding to those of a frame to be coded. Alternatively, it may be a difference between an average value of a variation, between frames, of at least one of the position, size and shape of the region of interest and a variation of a corresponding value between frames in a frame to be coded. Further, it may be a difference between an average value of variations between frames and at least one of values representing the position, size and shape of the region of interest in each frame.

This is effective if the region of interest is greatly enlarged and reduced and the like. The "information for specifying a region of interest defined on an image" may be coded as a function of time. This is effective in a case when the region of interest varies with a certain rule. The aforementioned information is explicitly described in a codestream. Thus, if a region of interest is set within an image, useful information can be provided to a decoding side and various types of processings for the region of interest can be realized. The apparatus according to US 2007/0230658 A1 Okada et al comprises: a region-of-interest setting unit which defines a region of interest (ROI) on an image; an image coding unit which encodes the image; a ROI information coding unit which encodes information for specifying the region of interest; and a codestream generator which generates a codestream by including therein the coded image and the coded information in an explicit manner. The "region-of-interest setting unit" may define the region of interest on the image by a specification from a user or by an automatic recognition of an object. Also the aforementioned information is explicitly described in a codestream so as to generate the codestream. When a plurality of regions of interest are defined on the image, a degree of priority is included in the information. Further US 2007/0230658 A1 Okada et a US 2007/0230658 A1 Okada et al relates to an image decoding method. This method is characterized in that a region including a region of interest is decoded from a codestream by referring to information for specifying the region of interest defined on an image wherein the information is explicitly described in the codestream that contains coded data of the image. The "region including a region of interest" may be a region of interest, a region including the region of interest and its peripheral region, or the entire image. Finally US 2007/

0230658 A1 Okada et al US 2007/0230658 A1 Okada et al relates to an image decoding apparatus. This apparatus comprises: a region-of-interest information decoding unit which decodes information for specifying a region of interest defined on an image wherein the information is explicitly described in a codestream that contains coded data of the image; and an image decoding unit which decodes a region including the region of interest from the codestream by referring to the decoded information. Nevertheless US 2007/0230658 A1 Okada et al US 2007/0230658 A1 Okada et al doesn't show a ROI-transcoding method or means for ROI-transcoding as in the case of "virtual" ROI-transcoding the codestream doesn't contain information about ROIs.

Normally moving objects are the interesting image region. For example, U.S. Pat. No. 6,590,999 B1 Comaniciu et al discloses a method and apparatus for real-time mean shift tracking of non-rigid objects. The computational complexity of the tracker is critical for most applications, since only a small percentage of a system's resources are typically allocated for tracking, while the rest of the resources are assigned to preprocessing stages or to higher-level tasks such as recognition, trajectory interpretation, and reasoning. In U.S. Pat. No. 6,590,999 B1 Comaniciu et al the tracking is based on visual features, such as color and/or texture, where statistical distributions of those features characterize the target. A degree of similarity is computed between a given target in a first frame and a candidate target in a successive frame, the degree being expressed by a metric derived from the Bhattacharyya coefficient. A gradient vector corresponding to a maximization of the Bhattacharyya coefficient is used to derive the most probable location of the candidate target in the successive frame.

More specifically, the method and apparatus in accordance with U.S. Pat. No. 6,590,999 B1 Comaniciu et al for real-time tracking of a target which appears in a plurality of successive image frames, comprises:
   a) Developing a statistical distribution as a characterization of a visual feature of each of a given target in a first frame and a candidate target in a successive frame,
   b) Computing a degree of similarity between the given target and the candidate target, the degree being expressed by a metric derived from the Bhattacharyya coefficient, and
   c) Applying an iterative comparative procedure to the degrees of similarity computed in step b), the iterations being based on a gradient vector corresponding to a maximization of the Bhattacharyya coefficient in order to shift the location of candidate target in the successive frame, to derive as the location of the candidate target in the successive frame that location which has characteristics most similar to the characteristics of the given target in the first frame.

The characterization of each target is expressed as a histogram and for deriving a new location $y_1$ for the candidate target in the successive frame by computing a gradient vector which corresponds to a maximization of the Bhattacharyya coefficient in the area of $y_0$ there is used a mean shift iteration to compute the gradient vector. A characterization processor develops a probability distribution of a feature of the target as a characterization of each target wherein the feature is selected from the group of color or texture of the target, said characterization processor develops a histogram as a characterization of each target and wherein said controller uses a mean shift iteration to compute a gradient vector along which the location of the candidate target is shifted.

SUMMARY OF THE INVENTION

In view of the above-described problem, an object of the present invention is a method for transcoding regions of interests, which first transmits and decodes images at moderate resolution.

The present invention will be described as follows.

According to an aspect of the present invention, the user is able to select a ROI in the decoded and displayed image and request high frequency information for the ROI. The requested high frequency information is then extracted from the coded data stream and added at the right position in the already decoded moderate resolution image. To provide the interesting object of the ROI always in high resolution even if the ROI changes its position in the image, the ROI is tracked by a tracking algorithm which estimates the current ROI position.

According to another aspect of the present invention, there is provided a sender side method for hierarchical transcoding of spatial scalable regions of interest. The method is mainly based on the combination of an extraction of user defined interesting image regions and a tracking of the interesting image regions. The extraction or transcoding of the spatial scalable regions of interest is based on the substitution of non-ROI packets containing high frequency image information, which is not relevant for the ROI. Due to this substitution all packet headers remain valid.

According to another aspect of the present invention, the main parts of this method are based on a user defined ROI the estimation of the ROI packets and the non-ROI packets, as well as the estimation of the ROI position over time.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the embodiments given below, serve to explain the principles of an aspect of the invention.

DESCRIPTION OF THE PREFERRED EMBODIMENTS

A reasonable solution to the lack-of-resolution problem is a surveillance system which provides the whole image at the same resolution as an ordinary system does but also allows the user to define and to extract ROIs in higher resolution. The invention makes it possible to first extract the image in moderate resolution from the hierarchical coded datastream (e.g. an JPEG2000 coded datastream). It further allows an extraction of the coefficients of the higher resolution levels from the coded datastream and to add the coefficients to the already decoded image, so that the image region of the ROI will be of higher resolution. This method is called hierarchical transcoding of spatial scalable regions of interest.

To estimate the position of the ROI the hierarchical transcoding method is combined with an object tracking algorithm. Thus, a user defined ROI is always displayed with higher resolution even if the interesting object of the ROI is moving, because the position of the ROI is shifted according to the tracking results.

Figure 1:
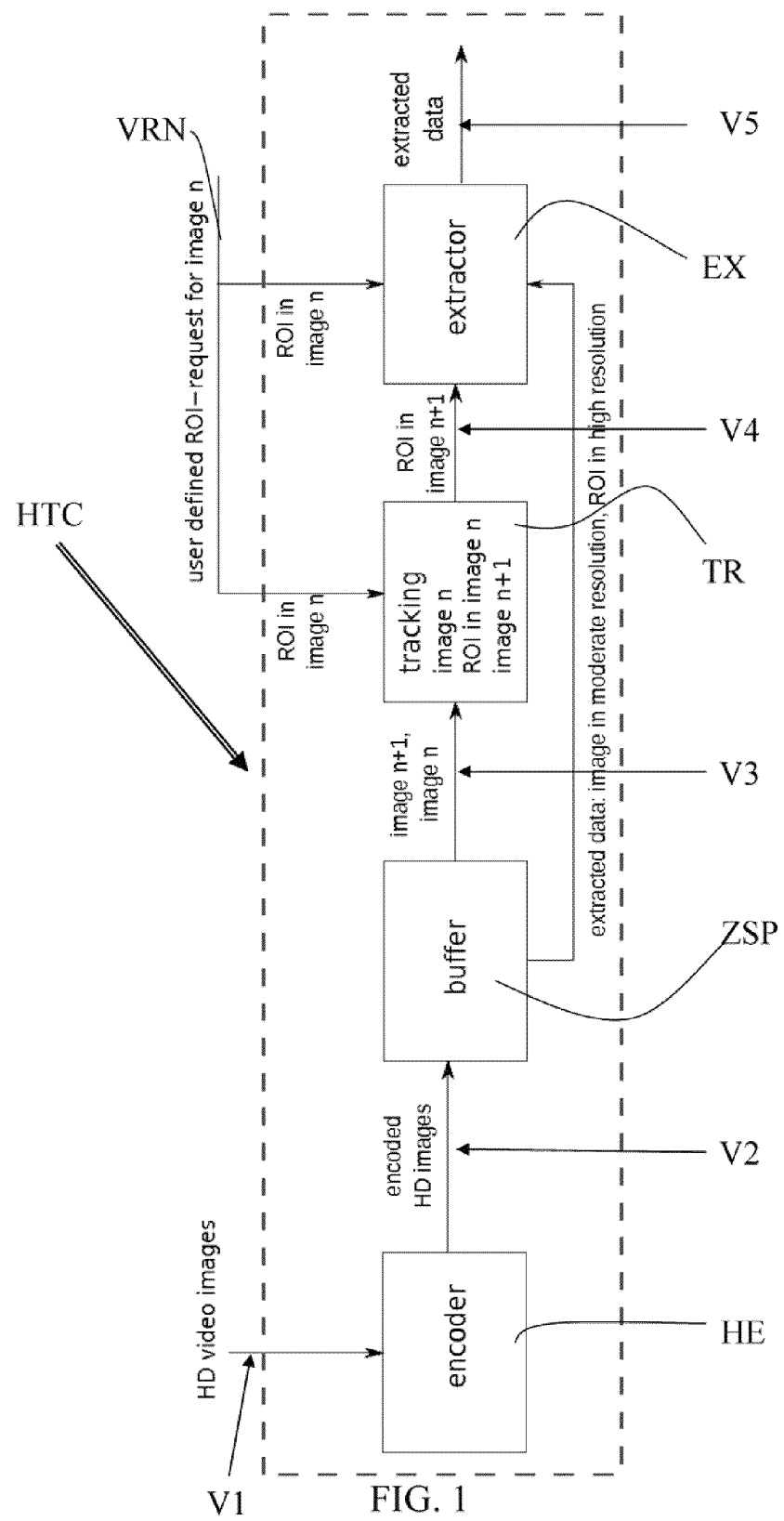
FIG. 1 is a functional block diagram showing a general configuration of a hierarchical transcoder according to a preferred embodiment of the present invention.

FIG. 1 shows the structure of a hierarchical transcoder HTC supporting spatial scalable region of interest transcoding. The transcoder HTC consists of a hierarchical coder HE (e.g. an JPEG2000 coder), a buffer ZSP for buffering the encoded high resolution images V2, an object tracking unit TR, and an extractor EX.

Normally the extractor EX extracts the image V4 in a moderate resolution. If a ROI is selected in frame n, the extractor EX extracts the ROI right away. Concurrently the tracking by tracking mean TR is initialized with the current image n, the position of the ROI in the current image n and with the subsequent image n+1 (see V3). The tracking algorithm estimates the position of the ROI in frame n+1 (see V4) and sends information of the position to the extractor EX. Consequently the extractor EX extracts the next frame n+1 in moderate resolution with the ROI in high resolution (see V5), et cetera.

Figure 2:
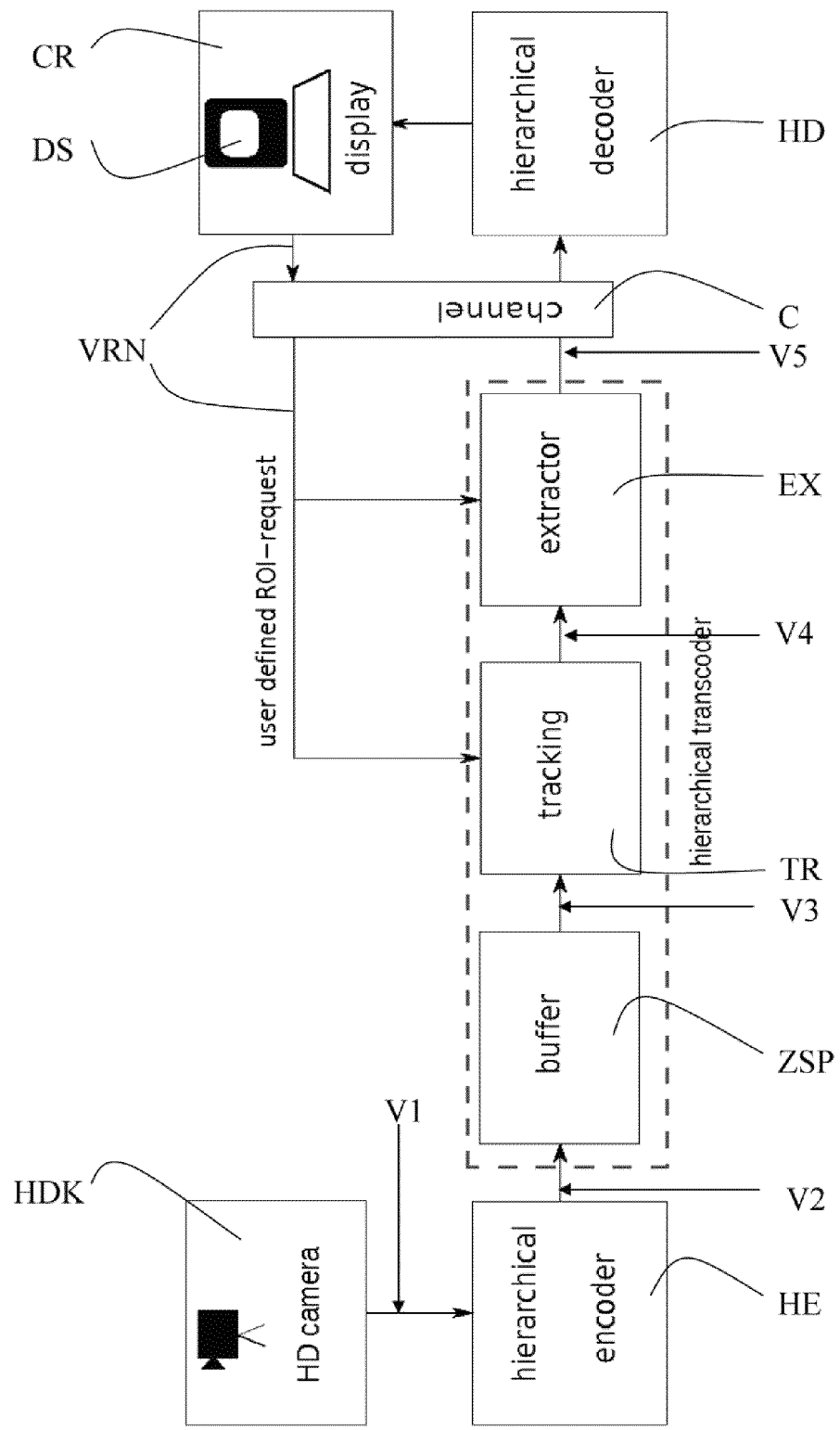
FIG. 2 is a preferred embodiment of system architecture of a video surveillance system supporting hierarchical transcoding with spatial scalable ROIs shown in FIG. 1.
Figure 3:
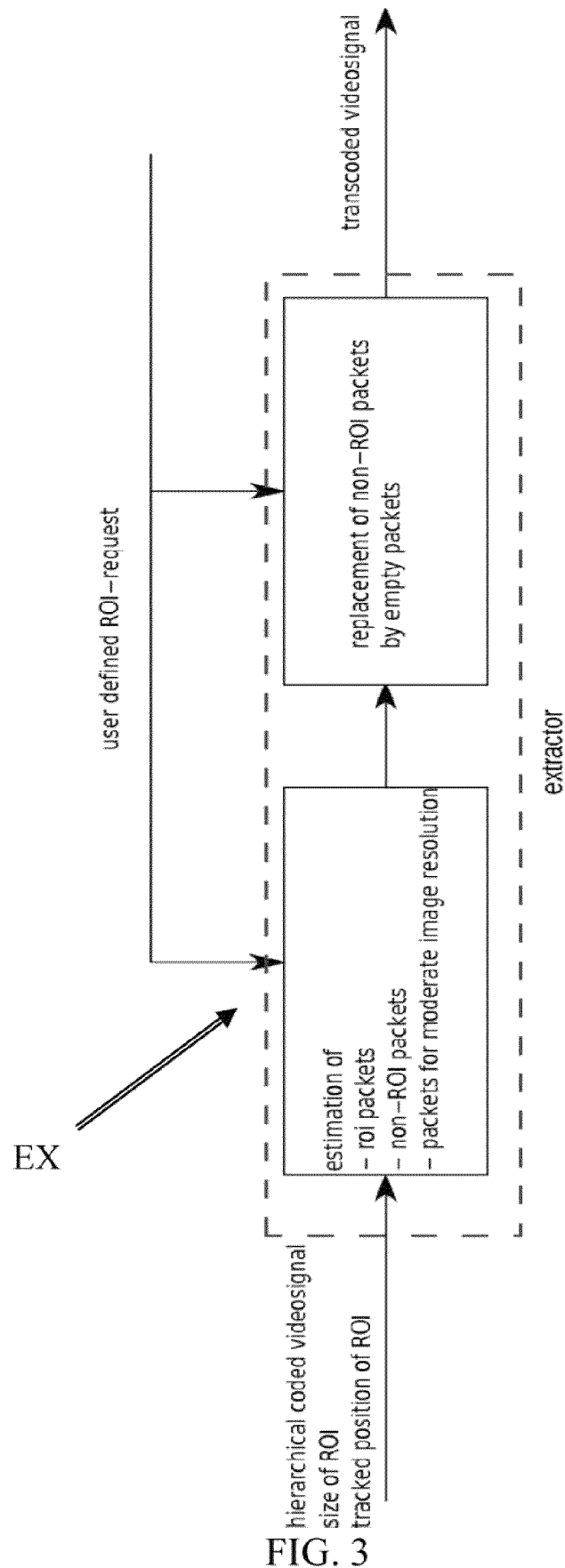
FIG. 3 is a functional block diagram showing an extractor of a hierarchical transcoder shown in FIG. 1.

FIG. 2 shows possible system architecture of a video surveillance system supporting hierarchical transcoding with spatial scalable ROIs. The system architecture contains a camera HDK with a HD sensor for recording the observed scene in high resolution (e.g. 1920×1080 pixels). The hierarchical encoder HTC is either integrated in the camera HDK or as an external unit connected to the camera HDK. Each frame V1 is JPEG2000 encoded by the hierarchical encoder HTC and stored in the buffer ZSP for potential later ROI extraction. Bitstreams containing the frames in moderate but proper resolution for surveillance applications are extracted out of the compressed HD frames. Like in regular video surveillance systems the frames are transmitted for example to a control room CR and shown in moderate resolution e.g. VGA or 4CIF on a display DS. Additional the user can select a ROI in the decoded and displayed image (on DS) and request high frequency information for the ROI (see VRN). The extractor EX extracts the requested ROI information and the according data is transmitted over channel C to the control room CR. Now important image details are visible for the watchman in the control room CR.

The JPEG2000 standard ISO/IEC 15444-1 "Information technology—JPEG 2000 image coding system—part 1", March 2000 specifies two methods for ROI coding: the general scaling based method (GSBM) and the maximum shift (MAXSHIFT) method, C. Christopoulos, A. Skodras, and T. Ebrahimi "The JPEG2000 still image coding system: an overview" (see above) and R. Rosenbaum and H. Schumann "Flexible, dynamic and compliant region of interest coding in JPEG2000" (see above).

The principle of GSBM is to scale up ROI coefficients so that the corresponding bits are placed in higher bit-planes. As any scaling value is allowed, an ROI mask is required at the decoder, because small scaling values can cause an overlapping between ROI and background. In the final bitstream these scaled-up bit-planes appear before any bit-planes associated with the background. Therefore, the entire ROI has to be decoded before the rest of the image. This and the fact that the GSBM needs a ROI mask representing the corresponding ROI coefficients at the time of encoding are not compatible with the aspect of a user defined ROI. In the considered video surveillance system (see FIG. 2) a user defined ROI can not be chosen before the watchman hasn't seen at least a low resolution image of the scene. As the ROI mask is also needed for decoding it has to be transmitted. That results in an increasing bitrate which is another drawback of GSBM.

The MAXSHIFT method is similar to GSBM but it shifts up the ROI coefficients well above the background. Thus the MAXSHIFT method doesn't need to transmit a ROI mask since no mask is required at the decoder side. But still the ROI has to be known at the time of encoding. Considering this the MAXSHIFT method is not suitable for video surveillance too.

In L. Liu and G. Fan "A new JPEG2000 region-of-interest image coding method: Partial significant bitplanes shift" IEEE Signal Processing Letters, 10(2):35-38, February 2003 a method combining the advantages of the two standard ROI coding methods called partial significant bitplanes shift (PSBShift) is proposed. This PSBShift method enables the flexible adjustment of compression quality of the ROI and the background. It also supports arbitrarily shaped ROI coding without coding the shape. However, the PSBShift method is not fully compatible with the JPEG2000 standard and it also requires the ROI selection at the time of encoding.

A method called prioritized region of interest coding is presented in V. Sanchez, A. Basu, and M. K. Mandal "Prioritized region of interest coding in JPEG2000" IEEE Transactions on Circuits and Systems for Video Technology, 14(9): 1149-1155, September 2004. This method uses a foveation technique to include partial background information around the ROI for a gradual increase in circumferential quality loss. The packets associated with the ROI and its closer background surroundings are placed in the code stream before the other packets. During the packet re-arrangement extra quality layers are inserted and packets are moved to different layers according to a level of priority. Since moved packets have to be replaced by empty packets in their former layer the overall number of packets increases. Furthermore the ROI has to be known at the time of encoding and only some of the background is decoded first together with the ROI.

A dynamic ROI coding technique which does not need the ROI definition during the time of encoding is proposed in R. Rosenbaum and H. Schumann "Flexible, dynamic and compliant region of interest coding in JPEG2000" (see above). This method is able to handle dynamic ROI information in interactive applications. The dynamic ROI coding method is based on the re-arranging of packets combined with dynamic layer insertion. For each layer non-ROI packets are up-shifted by one layer and ROI packets are kept in the initial layer. Since lower layers are decoded first, the up-shifting leads to the decoding of ROIs before the background is decoded. Even though the method is compatible with the JPEG2000 standard, it contains two major drawbacks: First, decoding of background information is not possible before the ROI is not fully processed and second, re-encoding of packet headers is necessary because up-shifted packets need a new position tag. The latter even causes decoding and re-encoding of the packet header tagtree including rate-distortion re-estimation increasing the transcoding complexity.

In J. Hou, X. Fang, J. Li, H. Yin, and S. Yu "Multi-rate, dynamic and compliant region of interest coding for JPEG2000" (see above) a similar standard compliant method for dynamic ROI coding based on multiple description coding (MDC) is presented. MDC provides two or more non hierarchical independently decodable representations of the same data. Different representations of a coded image are combined to form a bit stream containing one or multiple ROIs. Since code blocks from different bit streams are combined into new packets decoding and re-encoding of the packet header tagtree including rate-distortion re-estimation has to be done. Therefore, this method also increases the transcoding complexity and computing cost.

However, either the studies cause an increase in computing cost J. Hou, X. Fang, J. Li, H. Yin, and S. Yu "Multi-rate, dynamic and compliant region of interest coding for JPEG2000" (see above) or R. Rosenbaum and H. Schumann "Flexible, dynamic and compliant region of interest coding in JPEG2000" (see above) or they concentrate on prioritized transmitting of ROI with higher image quality while the rest of the image is not handled after the ROI is fully decoded (see C. Christopoulos, A. Skodras, and T. Ebrahimi "The JPEG2000 still image coding system: an overview", L. Liu and G. Fan "A new JPEG2000 region-of-interest image coding method: Partial significant bitplanes shift", R. Rosenbaum and H. Schumann "Flexible, dynamic and compliant region of interest coding in JPEG2000", M. Rabbani and R. Joshi "An overview of the JPEG 2000 still image compression standard" or V. Sanchez, A. Basu, and M. K. Mandal "Prioritized region of interest coding in JPEG2000"). Hence, all these methods are not an adequate solution to the described lack-of-resolution problem in regular video surveillance systems. For video surveillance the whole image in moderate resolution has to be encoded, transmitted and decoded first and not till then a ROI with higher spatial resolution can be requested by the user.

In the following an overview of the most important JPEG2000 features needed for extracting spatial scalable ROIs is given and then the proposed extraction process itself is explained.

Figure 5:
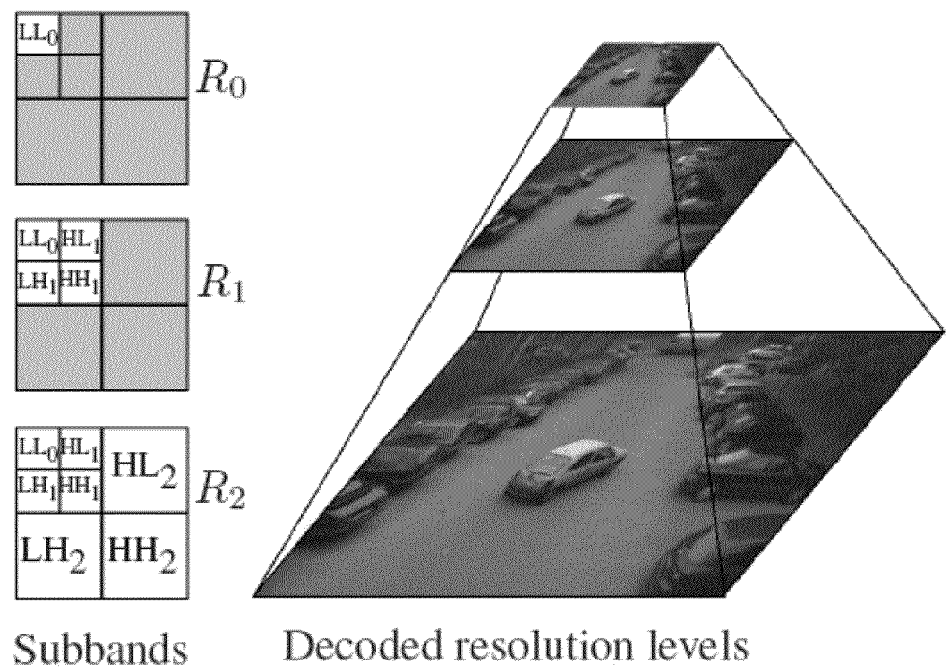
FIG. 5 is a Resolution pyramid of 2D DWT with three resolution levels $R_0$, $R_1$ and $R_2$ for the whole image together with the according sub bands.

Because of the discrete wavelet transform (DWT) JPEG2000 is pre-eminently suitable to support spatial scalable ROIs. FIG. 5 illustrates the result of applying a 2D DWT with three levels to an image. Besides of the original resolution level $R_2$ the image is also available in two lower resolution levels $R_1$ and $R_0$. If only the LL-sub band is decoded, the image of the smallest resolution level $R_0$ is obtained. If the HL-, LH- and HH-sub bands of the next higher resolution level $R_1$ are also decoded the image is reconstructed with the double resolution, et cetera. For each of the three resolution levels the corresponding sub bands are also shown in the left of FIG. 5 (white rectangles).

The Bit stream Syntax of JPEG2000 offers a huge flexibility to organize the encoded coefficients in the bit stream. This makes it easy to provide support of features like scalability, direct access to certain image regions or ROI-coding. The flexibility in organizing the data stream is enabled by the many different partitioning possibilities. Through sub bands and resolution levels the image data can be divided into frequency ranges. While code blocks permit the partitioning into space-frequency regions. Thus, code blocks allow access to a certain frequency range of a specific image region.

Beyond that precincts contain spatially adjacent code blocks from all sub bands of one resolution level. Since a precinct consists of an integer number of contiguous code blocks the border of the precinct matches the code block borders. Therefore, a code block can only contribute to one single precinct. The division into precincts facilitates the access to wavelet-coefficients which belong to a certain spatial region.

For each precinct the encoded data of the particular code blocks is written into one or several packets. A packet is a code stream segment containing a number of bitplane coding passes for all code blocks of a certain precinct. The number of bitplane coding passes can vary from code block to code block. Within the packet the code blocks of resolution level $R_r$ appear according to the sub band order (HL, LH and HH), except for the lowest resolution level $R_0$ where all code blocks belong to the LL-sub band. Packets of all precincts over all levels can be grouped to quality layers. Layers enable SNR scalability within a resolution level.

The order in which the packets are coded is indicated by the progression order. After encoding the order of the packets in the code stream also corresponds to the progression order. There are four possible progression orders to encode packets and influence their order in the code stream:

Layer-Resolution-Component-Position progression
Resolution-Layer-Component-Position progression
Resolution-Position-Component-Layer progression
Component-Position-Resolution-Layer progression E.g. if packets are coded obeying the Resolution-Position-Component-Layer (RPCL) progression all packets of the lowest resolution level for each position, component and quality layer appear in the code stream before a packet of the next higher level does.

Figure 6:
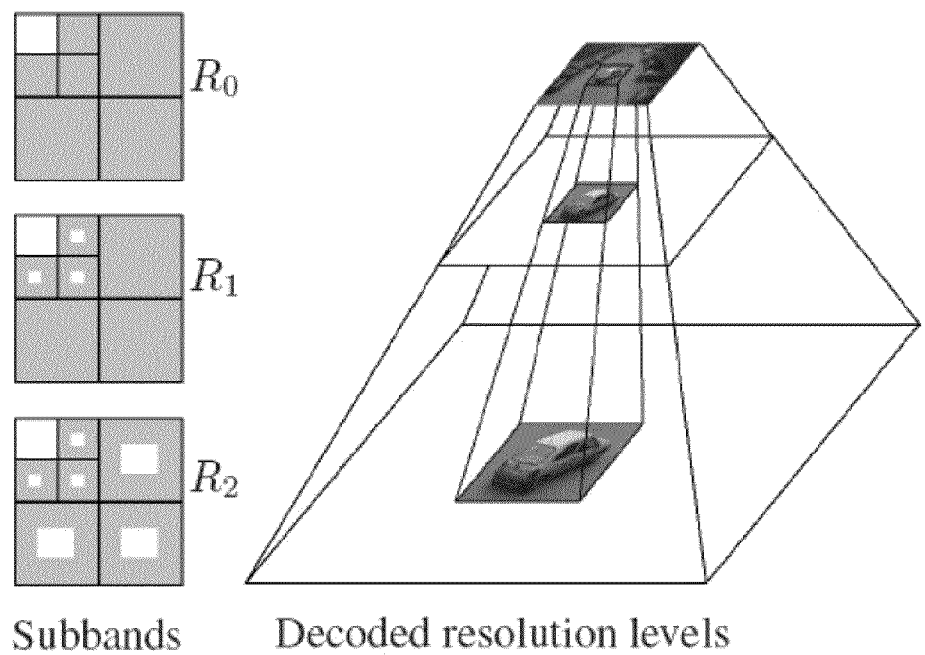
FIG. 6 is a Resolution pyramid of 2D DWT with three resolution levels $R_0$, $R_1$ and $R_2$ for an image with spatial scalable ROI with the according sub bands.

In the following interesting image regions containing a higher resolution compared to the rest of the image are referred to as spatial scalable regions of interest. It is possible to discard JPEG2000 packets, which contain information in higher resolution levels outside the ROI. The resolution pyramid is then reduced to the pyramid shown in FIG. 6. Information about higher resolution and therewith information about more image details is only provided for the ROI. That means sub bands of higher frequency information only contain information of the ROI as visualized in the left of FIG. 6.

Due to the hierarchical bit stream syntax the discarding of the non-ROI packets can be done simply by replacing them by empty packets.

Since precincts facilitate access to a certain frequency range of a specific spatial image region, it is possible to access a ROI at a particular resolution level through precincts, hereinafter named Spatial Access to ROIs. Here the different opportunities of defining precinct size play an important role and have to be considered. The precinct size can either be defined explicitly for each single level or it can be defined for one or several higher levels and is then adopted for lower levels. The latter will lead to a decrease in the number of precincts per resolution level.

Figures 7, 8:
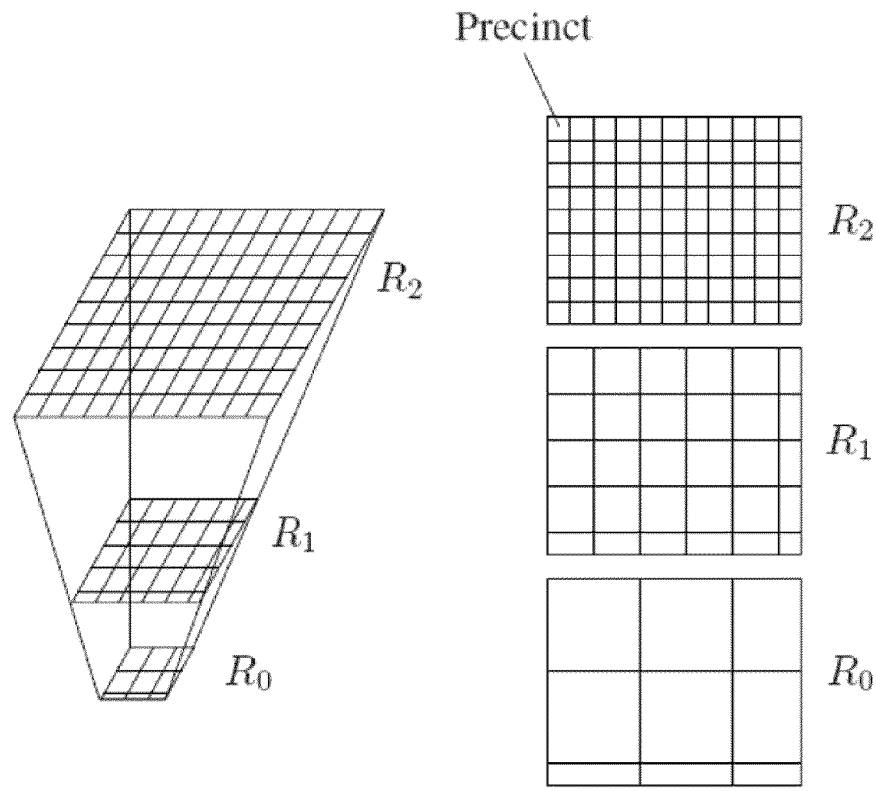
FIG. 7 is a precinct grid for precinct size.
FIG. 8 is a Bit stream coded with RPCL, three levels and one layer.

Therefore, the precinct grid changes from level to level as shown in FIG. 7. A precinct grid for precinct size is only defined for the highest resolution level R2. For precincts of lower resolution levels R1 and R0 the precinct size is adopted from the highest resolution level R2 leading to a decrease in the number of precincts of the lower resolution levels. During the decoding pass the precinct of the lower levels are upsampled to the final spatial resolution. Thus, a precinct with a precinct size adopted from a higher level covers a larger image area in the final decoded image as the precinct its size has been adopted from as shown in the right of FIG. 7. If a precinct grid with the same number of precincts is defined for every resolution level, an upsampled precinct will cover the same area as the corresponding precinct of a higher resolution level.

Under regular surveillance circumstances the video data is transmitted (see C), displayed (see DS) and stored in moderate resolution. Therefore the extractor EX extracts all packets (see V4), which contain image information in moderate resolution, from the encoded data stream (see V2) stored in the buffer ZSP. According to the invention a spatial scalable region of interest transcoding method for JPEG2000 coded images is proposed. The method takes advantage of important JPEG2000 features like the hierarchical syntax of the bit stream and the spatial scalability provided by the discrete wavelet transform. In the proposed method a bitstream of an image with HD resolution is transcoded into a bit stream containing the whole image in lower resolution (e.g. quarter HD resolution) and a ROI in HD resolution. The transcoding procedure is mainly based on deleting non-ROI packets and replacing them by empty packets.

If the packets in the code stream appear in a resolution progressive order (e.g. RLCP- or RPCL-progression order in a JPEG2000 data stream), all packets containing the lower resolution version of the image can be extracted immediately. A costly decoding of the packet header is avoided, as well an encoding of the packet headers after the re-arrangement of the data. Therefore the method according to the invention provides the image and ROI according to the demands of video surveillance and also has the advantage of lower complexity and faster processing, since no tag-tree re-encoding is required.

The extracted packets are decoded at the receiver and the image data is displayed. Thus, the user is able to request high frequency information of one or several interesting image regions. Based on such an ROI-request the extractor estimates all packets containing high frequency information of the ROI. These packets are the so called ROI packets. Non-ROI packets are all packets containing high frequency image information, which is not relevant for the ROI. It is not necessary to categorize the already transmitted packets containing the image in lower resolution into ROI and non-ROI packets.

As to provide flexible and dynamic ROI coding after a smaller version of a whole HD image has already been decoded, according to the invention there is proposed the spatial scalable ROI transcoding method. Since transcoding is realized by simply extracting the packets containing the lower resolution version of the image and the ROI in higher resolution from the bit stream of the whole image in HD resolution, transcoding complexity and computing cost are low. The spatial scalable ROI transcoding method performs two steps:
1. parsing of input JPEG2000 bit stream and user defined ROI information
2. extraction of ROI and background To obtain a ROI in HD resolution the information of the sub bands in higher resolution levels has to be available for the ROI. This information is contained in the input JPEG2000 bit stream if the whole HD image is compressed first. During spatial scalable ROI transcoding non-required image information outside of the ROI is removed from the sub bands of higher resolution levels. Finally, the whole image is still preserved at moderate resolution in the code stream and only the ROI contains information from higher resolution levels.

FIG. 8 shows a JPEG2000 bitstream of an image encoded with three levels, one layer, and in RPCL progression. For simplicity the image is coded with only one quality layer. In this case a precinct consists of exactly three packets, whereas each packet contains one of the three color components of the image location described by the precinct. Since RPCL progression is resolution progressive it is most suitable to implement the non-ROI packets removal. Decoding only the lowest resolution level $R_0$ will lead to a smaller version of the coded image. In this case the original image is then twice subsampled by a factor of 2. To obtain a bit stream with a spatial scalable ROI not only the packets of the lower resolution have to be extracted but also all ROI-packets of the higher level.

The ROI is indicated by the top left and bottom right coordinates of a rectangular bounding box. Based on the given coordinates of the ROI bounding box the ROI-precincts are estimated. The ROI-packets are then estimated straight forward through the ROI-precincts. If ROI size is not equal to a multiple of the precinct size height and width of the ROI have to be ceiled to the nearest higher multiple of the precinct size. This is done by adjusting the coordinates to nearest precinct corner position. Because of that the proposed method eventually extracts a few more pixel than selected by the user.

Figures 9, 10:
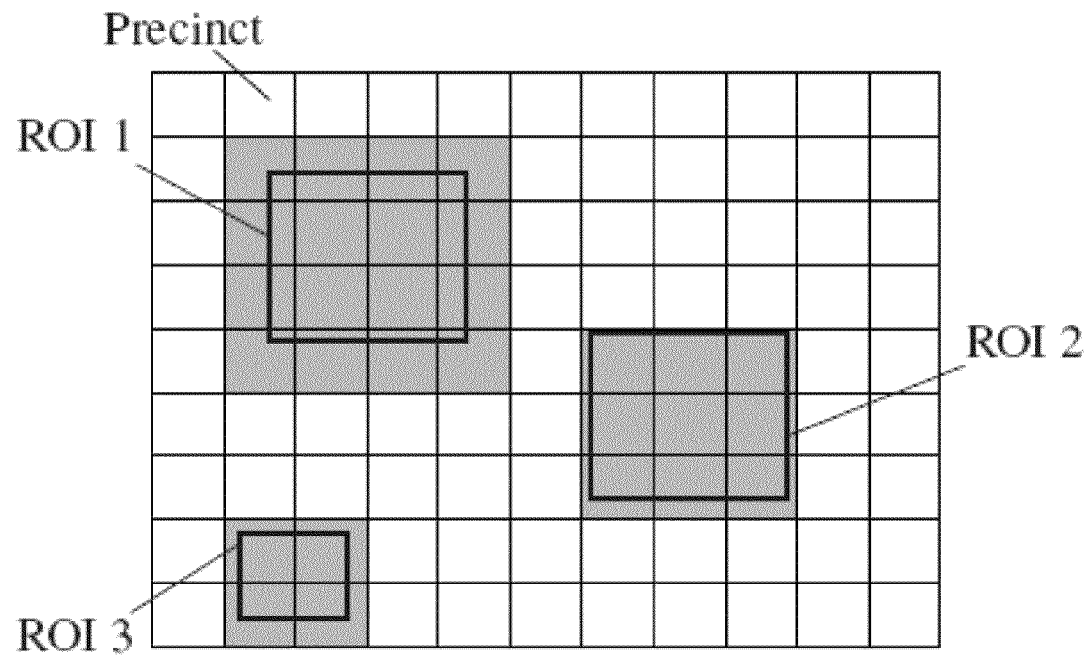
FIG. 9 is a precinct grid with two ROIs of equal size and a third smaller ROI.
FIG. 10 is a transcoded bit stream with a spatial scalable ROI extracted from the bit stream shown in FIG. 8.

FIG. 9 shows a precinct grid with two ROIs of equal size and a third smaller ROI. The position of ROI 1 leads to a higher number of extra extracted pixels than the position of ROI 2. Especially FIG. 9 shows that depending on the size and the position of the ROI the amount of extra transcoded pixels varies. Precincts, which have been transcoded for to extract the selected ROIs (red boxes), are of grey color in FIG. 9. If the Position of the ROI fits into the precinct grid like the one for ROI 2 less till no extra image information has to be extracted compared to an adversarial ROI position like the one of ROI 1.

Finer ROI selection is possible through smaller precinct size. But a smaller precinct size will lead to a larger number of small packets and the overhead caused by the packet headers increases. For a good trade-off between those two kinds of overhead we suggest a precinct size of 32×32 pixels for the highest resolution level. For every following less higher ROI resolution level this precinct size has to be subsampled by a factor of two. This has to be done to avoid an extraction of extra image information of lower frequency around the right and bottom border of the ROI caused by a precinct grid with precinct size adopted from a higher level. Hence, for all higher resolution levels, which are supposed to contain only ROI information after the transcoding, the subsampled precinct size has to be defined explicitly for each resolution level. That is to say the precinct grid has to be defined in such a manner that with each lower resolution level both precinct height and width are divided by two.

E.g. extracting a spatial scalable ROI from the top most two levels precinct sizes of 32×32 (for highest level) and 16×16 (for second highest level) are correct. For the background resolution levels we suggest to choose a larger precinct size to produce less packets and to keep the number of packet headers low.

The resolution at which the total image is required for proper video surveillance specifies the number of background resolution levels $R_{BG}$. The number of resolution levels left after subtracting $R_{BG}$ from the total number of resolution levels available $R_{max}$ defines the depth of the ROIs spatial scalability SROI according to equation (0):

$$S_{ROI} = R_{max} - R_{BG} \quad (0)$$

When ROI position and either the number of background resolution levels or the ROIs scalability depth are known a bit stream with spatial scalable ROI can be extracted from the input bit stream. FIG. 10 shows a transcoded bit stream with a spatial scalable ROI extracted from the bit stream shown in FIG. 8. To add the high frequency information at the right position in the image deleted non-ROI packets have to be replaced by empty packets. Empty packets have a body length of zero and a total size of one byte. To substitute non-ROI packets by empty packets neither decoding nor re-encoding of the tag tree has to be done. For this reason the complexity of the transcoding method is very low. Since the packets in the codestream are ordered by their resolution levels starting with $R_0$, an image in lower resolution can be transmitted first and the additional information to provide a spatial scalable ROI can be requested and added later. Therefore after classification the non-ROI packets have to be replaced by empty packets. This is necessary to add the high frequency image information at the right position in the already displayed moderate resolution image. Finally all empty packets and all ROI packets are transmitted and added to the already transmitted packets of the lower resolution version of the image.

As most standard video test sequences are in 4CIF or CIF resolution they are not appropriate to evaluate the spatial scalable ROI transcoding method, nor are the few standard test sequences with high resolution because they do not show typical surveillance scenarios. Therefore to achieve valuable experimental Results some HD sequences were recorded. The sequences have a length from 150 frames to about 2455 frames. Each frame has a resolution of 1920×1080 (HD 1080 p) and color format YCbCr in 4:2:2.

Figure 11:
FIG. 11 is a frame of the recorded sequences "Parking lot" (resolution 1920×1080)
Figure 12:
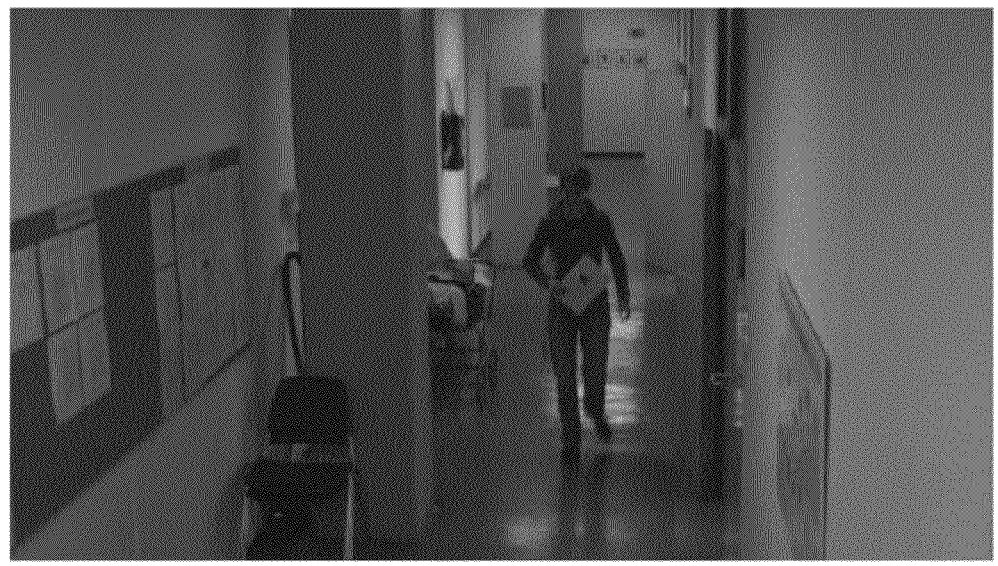
FIG. 12 is a frame of the recorded sequences "Hallway" (resolution 1920×1080)

The sequences were recorded with 23.98 fps. In FIG. 11 and FIG. 12 two frames of the recorded sequences "Parking lot" and "Hallway" are shown. Each frame is coded with 5 resolution levels ($R_{max}=4$) and with RPCL progression using the JPEG2000 kakadu V2.2 coder that comes with the book of D. S. Taubman and M. W. Marcellin "JPEG2000; Image Compression Fundamentals, Standards and Practice" Kluwer Academic Publishers, 2002. According to the invention a ROI with a scalability depth of 2 (SROI=2) should be extracted the precinct sizes are explicitly defined for the two upper most resolution levels. The precinct sizes are set to 32×32 and 16×16 pixel for the highest and second-highest resolution level. For the third-highest resolution level (later the highest background resolution level) a precinct size of 128×128 is chosen to reduce overhead caused by the packet headers of many small packets.

After applying the ROI transcoding method according to the invention on a high quality JPEG2000 bit stream of the frame "Parking lot" the amount of data reduces to about a quarter of the original bitstream while the high resolution is kept inside the spatial scalable ROI. Due to setting high frequency coefficients outside the ROI to zero during the extraction procedure, the ROI is slightly affected by a ringing artefact. But only at large bitrates a resulting decrease in image quality is noticeable.

Compared to the amount of saved data rate and gained image resolution the artefact is insignificant small. Table 1 lists the Y-PSNR values of the ROI in the HD image (frame of "Parking lot") and of the spatial scalable ROI with the corresponding image filesizes.

| HD image | | quarter HD image with spatial scalable ROI | | quarter HD image with spatial scalable ROI versus HD image | |
|---|---|---|---|---|---|
| filesize (KB) | Y-PSNR of ROI (dB) | filesize (KB) | Y-PSNR of ROI (dB) | filesize in % | Δ Y-PSNR |
| 152.6 | 39.0084 | 58.5 | 39.0084 | 38 | 0 |
| 266.3 | 42.4425 | 103.3 | 42.4248 | 39 | −0.0003 |
| 348.2 | 44.0044 | 129.5 | 43.9387 | 37 | −0.0177 |
| 524.4 | 46.3676 | 173.2 | 46.1595 | 33 | −0.0657 |
| 696.1 | 48.2604 | 210.5 | 47.8403 | 30 | −0.2081 |
| 994.6 | 50.9435 | 263.3 | 50.0553 | 26 | −0.8882 |
| 1424.7 | 54.1892 | 331.9 | 52.3246 | 26 | −1.8646 |
| 1682.9 | 55.9167 | 370.0 | 53.2978 | 22 | −2.6189 |

Especially in Table 1, Y-PSNR values for ROI (630,430) (1070,720) in frame of "Parking lot" in the HD image and in the extracted quarter HD image with spatial scalable ROI and the corresponding filesizes of the whole image are listed. The filesize of the extracted quarter HD image with spatial scalable ROI is also given in percentage of the HD image filesize. The difference of Y-PSNR of the scalable ROI to the Y-PSNR of the ROI in the HD image is also given. Expressing the filesize of the extracted quarter HD image with spatial scalable ROI in percentage of the HD image filesize shows that with larger HD bitstreams the amount of data extracted for an image in quarter HD resolution with spatial scalable ROI decreases as well as the Y-PSNR of the ROI.

To show that the magnitude of saved amounts of data doesn't depend much on the content of an image we coded many different JPEG2000 bit streams. Table 2 lists the image filesize of several, losslessly coded frames from different sequences in HD resolution, quarter HD resolution and in quarter HD resolution with spatial scalable ROI. By comparing the filesizes it is obvious that the amount of data of the transcoded HD image is reduced to 25% or less of the original HD image filesize. Since the represented sequences are of different content one can also see that the saved amount of data doesn't change much with the image content, but is influenced by the size of the ROI. The smaller the ROI the more amount of data is saved and vice versa.

| sequence | frame | ROI coordinates | HD image filesize (KB) | quarter HD image filesize (KB) | quarter HD image with spatial scalable ROI | | |
|---|---|---|---|---|---|---|---|
| | | | | | filesize (KB) | % of HD | % of ¼ HD |
| Parking_lot | 1700 | (858, 380)(1336, 594) | 2487.9 | 196.9 | 349.8 | 14 | 178 |
| Parking_lot | 1745 | (630, 430)(1070, 720) | 2482.8 | 197.4 | 383.1 | 15 | 194 |
| Parking_lot | 1780 | (732, 390)(1130, 638) | 2487.0 | 197.1 | 334.1 | 13 | 170 |
| Hallway | 0060 | (935, 310)(1080, 445) | 2162.1 | 159.6 | 196.1 | 9 | 123 |
| Staircase | 0217 | (1396, 318)(1626, 730) | 2288.4 | 162.9 | 289.1 | 13 | 177 |
| Staircase | 0003 | (464, 164)(762, 1000) | 2298.8 | 165.2 | 447.6 | 19 | 271 |
| Staircase | 0046 | (920, 318)(1456, 934) | 2268.0 | 160.4 | 566.5 | 25 | 353 |
| Street | 0330 | (300, 530)(460, 650) | 2570.4 | 197.6 | 247.4 | 10 | 125 |

Especially in Table 2, the filesize of different frames and different sequences in HD resolution, quarter HD resolution and quarter HD resolution with spatial scalable ROI is shown. The filesize of the extracted quarter HD image with spatial scalable ROI is also given in percentage of the HD image filesize and the quarter HD image filesize.

In the foregoing a fast method of transcoding spatial scalable ROIs according to the invention is presented. A bit stream with spatial scalable ROI provides the whole image in a moderate resolution required for sensible video surveillance as well as some important image region in higher resolution. By providing spatial scalable ROIs more important image details can be visualized without wasting data rate for unneeded image details. The bit stream is organized in such a way that the whole image in moderate resolution is decoded first followed by the additional ROI information as it is required by surveillance systems.

Figure 13:
FIG. 13 is a part of frame of the recorded sequences "Street" in 1920×1080 resolutions.
Figure 14:
FIG. 14 is a part of frame of the recorded sequences "Street" in 480×270 resolutions enlarged to 1920×1080.
Figure 15:
FIG. 15 is a part of frame of the recorded sequences "Street" in 480×270 resolutions with spatial scalable ROI enlarged to 1920×1080.

For appropriate testing of the proposed method typical surveillance scenarios in 1920×1080 resolution were recorded. To visualize the advantage of spatial scalable ROI transcoding the zoomed-in parts of a regular image in HD resolution, in 480×270 resolution, and the same image with spatial scalable ROI in HD resolution are shown in FIG. 13, FIG. 14 and FIG. 15. Compared to the image with quarter of the HD resolution in FIG. 14 interesting image details like e.g. the license plate are visible in the image with the spatial scalable ROI in FIG. 15. The quality of the spatial scalable ROI differs only slightly from the corresponding image region in the HD image. The experimental results show that the presented method efficiently saves data rate by discarding unnecessary high frequency image information while preserving important image information. This and the low complexity make the transcoding method very suitable for video surveillance applications.

Normally moving objects are the interesting image region. To always display an user-defined object in high image resolution, according to the invention a tracking algorithm is used to track the position of the object and to shift the position of the ROI according to the tracking result. For a video surveillance system it is not suitable that the ROI has to be selected manually for each single frame. The ROI should be selected by the user only once to initialize the spatial scalable ROI transcoding. But in many cases the interesting image regions consist of moving objects like persons or cars. Thus, the content of the ROI has to be tracked. If the interesting object moves the new position of the ROI has to be estimated based on the tracking result before the ROI can be extracted.

Therefore, according to the Invention the ROI extraction method with mean shift tracking is combined to get a powerful automatic ROI transcoding method for video surveillance systems. Mean shift tracking per se is know, see for example D. Comaniciu and V. Ramesh and P. Meer "Real-Time Tracking of Non-Rigid Objects using mean shift" in Proc. IEEE Conf. Computer Vision and Pattern recognition, 2: 142-149, 2000 or D. Comaniciu and V. Ramesh and P. Meer "Mean Shift: A Robust Approach Toward Feature Space Analysis" in IEEE Transactions on Pattern Analysis and Machine Intelligence, 24(5):603-619, 2002.

Based on the distribution of a characteristic feature of the ROI, e.g the color histogram, the mean shift algorithm finds the correct position of the ROI in the following frame. Mean shift tracking discriminates between a target model in frame n and a candidate model in frame n+1. The target model or reference model can be defined as the color density distribution of the interesting image region. The aim of mean shift tracking is the localization of the candidate model in frame n+1. Or more precise, to find the most similar candidate model to the target model and to estimate the motion vector of the tracked object based on the positions of the target model and its most similar candidate model.

As the mean shift tracker cannot initialize the ROI by itself, the algorithm is intialized with the data of the user defined ROI. Therefore, the user identifies the interesting object in frame n by marking part of it with an elliptic region. The discrete density of the color histogram $$\hat{q} = \{\hat{q}_u\}_{u=1\ldots m} \left(\text{whereas} \sum_{u=1}^{m} \hat{q}_u = 1\right)$$

of the selected ellipse and therewith for the target model is then estimated. Further the target model q is assumed to be centered at pixel location 0 while the candidate model $$\hat{p}(y) = \{\hat{p}_u(y)\}_{u=1\ldots m} \left(\text{whereas} \sum_{u=1}^{m} \hat{p}_u = 1\right)$$

in the following frame is located at position y. The probability of a certain color appearing in the selected ellipse can be expressed as the probability of the feature u=1 . . . m occurring in the target model, which is $$\hat{q}_u = C \sum_{i=1}^{n} k(\|x_i^*\|^2) \delta[b(x_i^*) - u] \quad (1)$$

where δ is the impulse function and normalization constant C is the reciprocal of the sum of values of the kernel function k(x). The kernel K with kernel function k(x) makes the density estimation more reliable because it provides pixels farther away from the center of the ellipse with smaller weight. Hence the least reliable outer pixels don't influence the density estimation to much. Similarly, the candidate model can be defined as $$\hat{p}_u(y) = C_h \sum_{i=1}^{n_h} k\left(\left\|\frac{y - x_i^*}{h}\right\|\right)^2 \delta[b(x_i) - u] \quad (2)$$

The problem of localization the candidate model in the next frame n+1 is formulated as the derivation of the estimate that maximizes the Bayes error between the reference distribution of the target model and the distribution of the candidate model. For the similarity measure according to the invention a discrete formulation of the Bhattacharya coefficient is chosen since there is a discrete color distributions on the one hand and the Bhattacharya coefficient is nearly optimal and imposes a metric structure on the other hand.

The Bhattacharya coefficient and the distance between the two color distributions of target and candidate model are defined as follows $$\rho[\hat{p}(y), \hat{q}] = \sum_{u=1}^{m} \sqrt{\hat{p}_u(y)\hat{q}_u} \quad (3)$$

$$d(y) = \sqrt{1 - \rho[\hat{p}(y), \hat{q}]} \quad (4)$$

The aim is to minimize the distance (4) as a function of y in the neighbourhood of a given position yo by using the mean shift algorithm. Starting with the Taylor expansion around $p_u$(yo) the Bhattacharya coefficient is approximated as $$\rho[\hat{p}(\hat{y}_0), \hat{q}] \approx \frac{1}{2} \sum_{u=1}^{m} \sqrt{\hat{p}_u(\hat{y}_0)\hat{q}_u} + \frac{C_h}{2} \sum_{i=1}^{n_h} \omega_i k\left(\left\|\frac{y - x_i}{h}\right\|^2\right) \quad (5)$$

with $$\omega_i = \sum_{u=1}^{m} \delta[b(x_i) - u]\sqrt{\frac{\hat{q}_u}{\hat{p}_u(\hat{y}_0)}} \quad (6)$$

Figure 4:
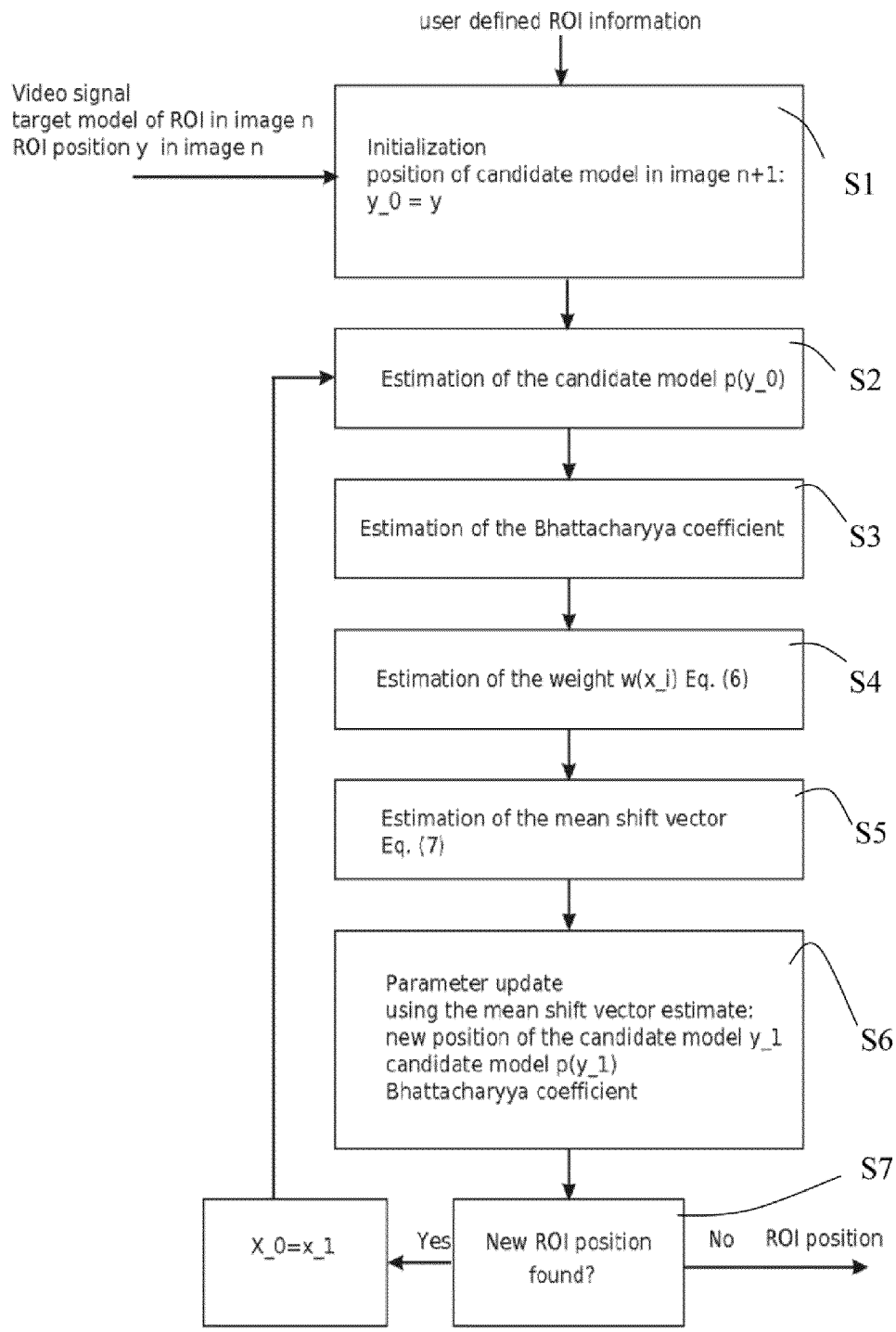
FIG. 4 is a flowchart explaining an operation of the video surveillance system shown in FIG. 2.

In equation (5) only the second term is dependent on y. Hence, for minimizing the distance it is sufficient to maximize the second term of (5). This term corresponds to the density estimate computed with kernel profile k at location y in frame, whereas the data is weighted with $\omega_i$. The maximization can be achieved using the mean shift algorithm. By running this algorithm the kernel is recursively moved from $\hat{y}_0$ to $\hat{y}_1$ according to the mean shift vector $$\hat{y}_1(x) = \frac{\sum_{i=1}^{n_h} x_i \omega_i g\left(\left\|\frac{\hat{y}_0 - x_i}{h}\right\|^2\right)}{\sum_{i=1}^{n_h} \omega_i g\left(\left\|\frac{\hat{y}_0 - x_i}{h}\right\|^2\right)} \quad (7)$$

where the derivation of k exists for all $x \in [0,\infty)$ and $g(x)=-k'(x)$. Given the distribution $\{\hat{q}_u\}_{u=1 \ldots m}$ of the target model at location $y_o$ in frame n the algorithm iterates as follows (see FIG. 4, which is a flowchart explaining the operation of the video surveillance system shown in FIG. 2):

1. Initialize the location of the candidate model in frame n+1 with $\hat{y}_0$ (see step S1). Subsequently compute the distribution $\hat{p}(\hat{y}_0)=\{\hat{p}_u(\hat{y}_0)\}_{u=1 \ldots m}$ (see step S2) and $$\rho[\hat{p}(\hat{y}_0), \hat{q}] = \sum_{u=1}^{m} \sqrt{\hat{p}_u(\hat{y}_0)\hat{q}_u}$$

(see step S3 ).
2. Compute the weights $\omega_i$ according to equation (6) (see step S4).
3. Estimate the new position of the candidate model according to the mean shift vector according to equation (7) (see step S5). Update $\{\hat{p}_u(\hat{y}_1)_{u=1 \ldots m}\}$ and calculate $\rho[\hat{p}(\hat{y}_1), \hat{q}]$. (see step S6).
4. Stop if $\|\hat{y}_1-\hat{y}_0\|<\epsilon$, else go $\hat{y}_0 \leftarrow \hat{y}_1$ to step 1 (see step S7).

The algorithm uses the mean shift vector in step 3 to maximize the Bhattacharya coefficient. The termination threshold $\epsilon$ in step 4 implies that the vectors $\hat{y}_0$ and $\hat{y}_1$ point at the same pixel in image co-ordinates. Therefore, the algorithm terminates for one thing if the same or a larger value for the Bhattacharya coefficient is found and for the other thing if the candidate model doesn't change its position in two subsequent iterations.

Figure 16:
FIG. 16 is a Joint ROI Transcoding and Tracking based on the size and position of the ellipse the rectangular bounding box according to the invention and FIG. 17 is a part of different frames (left, right) of the recorded sequences "Parking lot" in 480×270 resolution with spatial scalable ROI enlarged to 1920×1080 resolutions, shown after tracking the ROI over 30 frames.

To enlarge an interesting image detail the user selects a ROI in the low resolution version of the current frame by marking it with an ellipse. Based on the size and position of the ellipse the rectangular bounding box of the ROI is estimated as shown in FIG. 16. For Joint ROI Transcoding and Tracking according to the invention after the interesting object is marked with an ellipse the ROI bounding box is estimated based on the size of the ellipse. For transcoding a license plate height and width of the ROI bounding box are four times the size of the ellipse's height and width.

E.g. for tracking and extracting license plates the default ratio between the width of the ellipse and the width of the bounding box is set to 1:4, the ratio of the heights respectively. This ratio guarantees that the license plates are obtained in a good quality. For a user defined ratio between ellipse and bounding box the user can select the ROI bounding box in addition to the ellipse by defining the top left and bottom right coordinates of the bounding box. With the chosen ROI coordinates the mean shift tracking as well as the ROI extraction for the current frame are initialized. While the ROI can be extracted directly out of the code stream of the current frame the mean shift tracking first starts after the next frame in low resolution is decoded.

The steps of automatic ROI transcoding are as follows:
1. A frame n in moderate resolution is extracted from the JPEG2000 bit stream of the HD frame.
2. This moderate resolution version of frame n is decoded.
3. A ROI is selected by the user in the decoded frame n in moderate resolution.
4. The requested ROI is extracted immediately for the current frame n.
5. The next frame n+1 in moderate resolution is extracted and decoded.
6. The mean shift tracking is initialized with the ROI information of the previous frame n and moderate resolution versions of the previous frame n and the present frame n+1.
7. Based on the tracking result the ROI information for frame n+1 is given and the ROI is extracted for frame n+1.

8. The procedure starts over at step 5 for the next frame.

Since the ROI extraction is precinct based, the actual extracted image region is determined by the ROI-precincts. This means that even if new coordinates for the top left and bottom right edges of the ROI bounding box are estimated after running the tracking algorithm the actual extracted image region might not change its position and size. Not until the new coordinates are located in a new precinct a movement of the extracted image region can be noticed. But since the ROI bounding box always adapts its position according to the new location of the interesting object it is guaranteed that the important image details are always provided in high resolution.

Figure 17:

For experimental test, there was applied the mean shift extended ROI transcoding method on several of the recorded HD video test sequences. In FIG. 17 the extracted and tracked ROI in the beginning of Street can be seen, especially a part of frame 2 (left) and the same part in frame 32 (right) of sequence "Parking lot" in 480×270 resolution with spatial scalable ROI enlarged to 1920×1080 resolution are shown after tracking the ROI over 30 frames. Table 3 shows the results by listing the filesize of various coded sequences in HD resolution, quarter HD resolution and quarter HD resolution with spatial scalable ROI.

| sequence | length in frames | average ROI size (pixel) | HD video filesize (MB) | quarter HD video filesize (MB) | quarter HD video with spatial scalable ROI | | |
|---|---|---|---|---|---|---|---|
| | | | | | filesize (MB) | % HD | % ¼ HD |
| Parking_lot | 230 | 240 × 160 | 324 | 50.9 | 59.9 | 18 | 118 |
| Parking_lot | 220 | 480 × 300 | 306.7 | 48.5 | 71.7 | 23 | 148 |
| Parking_lot | 36 | 80 × 140 | 51 | 8 | 8.9 | 17 | 111 |
| Hallway | 88 | 240 × 400 | 88.4 | 15.3 | 20.1 | 23 | 131 |
| Hallway | 120 | 280 × 720 | 117.3 | 20.2 | 32.9 | 28 | 163 |
| Staircase | 78 | 474 × 600 | 89.7 | 13.8 | 22.3 | 25 | 162 |
| Staircase | 246 | 280 × 480 | 283.5 | 43.5 | 62.3 | 22 | 143 |
| Street | 200 | 620 × 280 | 296.5 | 43.5 | 70.3 | 24 | 162 |

Especially in Table 3, the filesize of different sequences in HD resolution, quarter HD resolution and quarter HD resolution with spatial scalable ROI is shown. The filesize of transcoded quarter HD sequences with spatial scalable ROI is also given in percentage of the HD video filesize and the quarter HD video filesize.

With 337×385 pixels the average ROI size of the transcoded sequences in Table 3 is about as large as one quarter of the HD image. For this ROI size the amount of data of the transcoded HD sequence is reduced to 22.5% of the original HD sequence. For a fair comparison each frame of the transcoded sequences with spatial scalable ROI contains a ROI in HD resolution. As explained before in the surveillance system the transcoded sequence will only contain frames with spatial scalable ROI if the user requires it otherwise the sequence contains frames in moderate resolution. Hence, the average file-size for the transcoded sequences will even drop a little more for a video surveillance system. Since the transcoded sequences contain different scenes it can be shown that the saved amount of data doesn't change much with the image content. The saved amount of data is a lot more influenced by the size of the ROI. The smaller the ROI the more amount of data is saved and vice versa.

Preferably, a mean shift tracking extended spatial scalable ROI transcoding for JPEG2000 has been shown. Combining the spatial scalable ROI transcoding method with mean shift tracking according to the invention leads to a powerful ROI extraction tool for video sequences especially for video surveillance applications. The ROI transcoding method saves 77.5% of HD video filesize while preserving important image details. This is mainly done by discarding unimportant high frequent image data of the background, while keeping the high frequent information for the ROI. To guarantee that the right image region is kept in high resolution the ROI is tracked using the mean shift algorithm.

The hierarchical transcoding method of spatial scalable regions of interest ROI as described above may be a program to be executed by a computer or the like and in this case, the program may be delivered through a network, either wired or wireless, or may be stored in a recording medium such as a CD, a DVD, or a flash memory.

The invention can by applied in future digital video surveillance systems. The transcoding of spatial scalable ROIs is especially useful for systems with low bandwidth and/or small storage.

The invention can also be applied for the compression of image data for high resolution displays like so called display walls. Such display walls are mostly combined with perceptual oriented displaying techniques, which always provide the image region which is interesting for the viewer in high resolution.

The invention is not limited to the above embodiments and various modifications may be made without departing from the spirit and scope of the invention. Any improvement may be made in part or all of the components.

What we claimed is:

1. A method for transcoding regions of interest (ROI) in a video surveillance system that includes a camera with a high definition (HD) sensor for recording an observed scene in high resolution, a hierarchical encoder, a buffer for potential later ROI extraction and an extractor, the method comprising:
   extracting an image in moderate resolution from a hierarchical encoded datastream;
   extracting coefficients of higher resolution levels from said hierarchical encoded datastream; and
   adding the coefficients to an already decoded image, so that an image region of an ROI is of higher resolution and a hierarchical transcoding of spatial scalable regions of interest (ROI) is made;
   wherein the extractor extracts all packets, which contain image information in moderate resolution, from said hierarchical encoded datastream stored in the buffer and said extracted packets are decoded at a receiver and image data is displayed,
   wherein a user is able to request high frequency information of one or several interesting image regions, and
   wherein based on such a user request said extractor estimates all ROI packets containing high frequency information of the ROI, wherein non-ROI packets are all packets containing high frequency image information, wherein after classification the non-ROI packets are replaced by empty packets and wherein all empty packets and all ROI packets are transmitted and added to already transmitted packets of a lower resolution version of the image.

2. The method according to claim 1, wherein said hierarchical encoded datastream is a datatstream encoded in accordance with an image compression standard and coding system created by Joint Photographic Experts Group in 2000 (JPEG2000).

3. The method according to claim 1, wherein said method further comprises:
parsing of an input bit stream encoded in accordance with an image compression standard and coding system created by Joint Photographic Experts Group in 2000 (JPEG2000) and user defined ROI information; and
extracting ROI.

4. The method according to claim 3, wherein:
(1) a frame n is extracted in moderate resolution from said JPEG2000 bit stream of a high definition (HD) frame;
(2) the frame n extracted in moderate resolution is decoded;
(3) a ROI is selected by a user in said decoded frame n;
(4) said user selected ROI is extracted immediately for frame n;
(5) a frame n+1 is extracted in moderate resolution and decoded;
(6) a mean shift tracking is initialized with said extracted user selected ROI for frame n and with said extracted moderate resolution versions of frame n and frame n+1; and
(7) based on a result of the mean shift tracking, ROI information for frame n+1 is given and a ROI is extracted for frame n+1.

5. The method according to claim 3, wherein a number of resolution levels left after subtracting a number of background resolution levels $R_{BG}$ from a total number of resolution levels available $R_{max}$ defines a depth of ROIs spatial scalability $S_{ROI}$ according to equation:

$$S_{ROI}=R_{max}-R_{BG}$$

said number of background resolution levels $R_{BG}$ being at which a total image is required for video surveillance.

6. The method according to claim 1, wherein to estimate a position of said ROI the method is combined with an object tracking algorithm to track a position of an object and to shift the position of the ROI according to a tracking result whereby a user of the video surveillance system identifies an interesting object in frame n.

7. The method according to claim 6, wherein an extraction or transcoding of the spatial scalable regions of interest is based on a substitution of non-ROI packets containing high frequency image information, which is not relevant for the ROI, thereby due to this substitution all packet headers remain valid.

8. The method according to claim 6, wherein to enlarge an interesting image detail a user selects a ROI in a low resolution version of a current frame by marking it with an ellipse and wherein based on a size and position of said ellipse a rectangular bounding box of the ROI is estimated.

9. The method according to claim 8, wherein for joint ROI transcoding and tracking after the interesting image detail is marked with the ellipse the rectangular bounding box is estimated based on the size of the ellipse and wherein for transcoding said rectangular bounding box is four times the size of said ellipse's height and width.

10. A method according to claim 6, wherein the operation of the video surveillance system comprising the steps of:
A) initializing the location of a candidate model in frame n+1 with $\hat{y}_0$.
B) computing a distribution $\hat{p}(\hat{y}_0)=\{\hat{p}_u(\hat{y}_0)\}_{u=1 \ldots m}$;
C) computing $$\rho[\hat{p}(\hat{y}_0), \hat{q}] = \sum_{u=1}^{m} \sqrt{\hat{p}_u(\hat{y}_0)\hat{q}_u};$$

D) computing weights $\omega_i$ according to equation:

$$(6) \omega_i = \sum_{u=1}^{m} \delta[b(x_i)-u]\sqrt{\frac{\hat{q}_u}{\hat{p}_u(\hat{y}_0)}};$$

E) estimating the new position of said candidate model according to a mean shift vector according to equation:

$$\hat{y}_1(x) = \frac{\sum_{i=1}^{n_h} x_i \omega_i g\left(\left\|\frac{\hat{y}_0 - x_i}{h}\right\|^2\right)}{\sum_{i=1}^{n_h} \omega_i g\left(\left\|\frac{\hat{y}_0 - x_i}{h}\right\|^2\right)};$$

F) updating $\{\hat{p}_u(\hat{y}_1)_{u=1 \ldots m}\}$ and calculating $\rho[\hat{p}(\hat{y}_1), \hat{q}]$; and
G) stopping if $\|\hat{y}_1-\hat{y}_0\|<\epsilon$, else go $\hat{y}_0 \leftarrow \hat{y}_1$ to step A).

11. A non-transitory computer a readable medium comprising computer code, the computer code, when executed by a computer, performs a method according to claim 1.

12. A system for transcoding regions of interest (ROI) in a video surveillance system comprising:
a camera with a high definition (HD) sensor for recording an observed scene in high resolution;
a hierarchical encoder connected to said camera for encoding received HD video images into encoded HD images;
a hierarchical transcoder comprising a buffer for said encoded HD images and an extractor for potential later ROI extraction;
a hierarchical decoder connected to said hierarchical transcoder and a control room of said video surveillance system; and
a tracking means for tracking a position of an object and to shift a position of a ROI according to a tracking result, said tracking means being connected with said buffer for receiving images n and n+1, said tracking means further being connected with said control room for receiving user defined ROI-request for image n, and said tracking means also being connected with said extractor for extracting ROI in image n+1 received from said tracking means, said extractor also being connected with said buffer for extracting data images in moderate resolution and ROI in high resolution.

* * * * *

UNITED STATES PATENT AND TRADEMARK OFFICE
CERTIFICATE OF CORRECTION

PATENT NO. : 8,345,749 B2
APPLICATION NO. : 12/550760
DATED : January 1, 2013
INVENTOR(S) : Katharina Quast et al.

It is certified that error appears in the above-identified patent and that said Letters Patent is hereby corrected as shown below:

Column 22, Line 3, (Claim 10, Line 1), delete "the".

Column 22, Line 4, (Claim 10, Line 2), delete "comprising" and insert --comprises--.

Column 22, Line 5, (Claim 10, Line 3), delete "the" and insert --a--.

Column 22, Line 37, (Claim 11, Line 1), after "computer", delete "a".

Signed and Sealed this
Nineteenth Day of March, 2013

Teresa Stanek Rea
*Acting Director of the United States Patent and Trademark Office*